United States Patent [19]

Stiot et al.

[11] 4,101,543
[45] Jul. 18, 1978

[54] BENZENE-AZO-HETEROCYCLIC DYESTUFFS DERIVED FROM ALKYL AMINOCINNAMATES OR AMINOCINNAMIDE

[75] Inventors: Jean-Pierre Henri Stiot, Saint Pierre les Elbeuf; Claude Marie Henri Emile Brouard, Sotteville les Rouen; Jean Marie Louis Leroy, Saint Etienne du Rouvray, all of

[73] Assignee: Produits Chimiques Ugine Kuhlmann, Paris, France

[21] Appl. No.: 441,791

[22] Filed: Feb. 12, 1974

[30] Foreign Application Priority Data

Feb. 16, 1973 [FR] France .................. 73.05503

[51] Int. Cl.$^2$ .............. C09B 29/36; C09B 29/38; C09B 31/14; C09B 33/02
[52] U.S. Cl. .................. 260/162; 260/152; 260/155; 260/156; 260/160; 260/163; 260/164; 260/165; 260/174; 260/177; 260/178; 260/184; 260/186; 260/187; 260/191; 260/196; 260/207.1
[58] Field of Search .............. 260/152, 155, 156, 163, 260/164, 165, 160

[56] References Cited

U.S. PATENT DOCUMENTS

| 3,578,654 | 5/1971 | Favre .................. 260/186 |
| 3,663,530 | 5/1972 | Leroy et al. .......... 260/163 |

FOREIGN PATENT DOCUMENTS

| 600,282 | 6/1960 | Canada .................. 260/163 |
| 1,029,747 | 5/1966 | United Kingdom .......... 260/163 |

Primary Examiner—Daniel E. Wyman
Assistant Examiner—John J. Doll
Attorney, Agent, or Firm—Beveridge, DeGrandi, Kline & Lunsford

[57] ABSTRACT

A dyestuff of the formula:

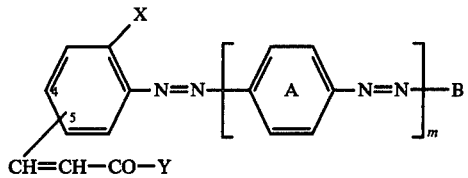

in which —CH=CH—CO—Y is fixed in the 4 or 5 position, X is hydrogen or chlorine, Y is amino or alkoxy containing 1 to 4 carbon atoms, the p-phenylene nucleus A is unsubstituted or substituted by chlorine, alkyl containing 1 to 4 carbon atoms, alkoxy containing 1 to 4 carbon atoms, formylamino, acetylamino, propanoylamino, benzoylamino or cinnamoylamino, $m$ is 0 or 1, and B represents the radical N-methyl (or ethyl)-4-hydroxy-2-oxo-quinolyl, 2-hydroxy-carbazolyl, 3-hydroxy-dibenzofuranyl, 2-phenylindolyl, N-methyl (or ethyl)-2-hydroxy-3-cyano-4-methyl-6-oxopyridyl, 3,6-dimethyl-4-hydroxy-1-phenyl-(4,5,-b)pyrazolopyridyl or the radical of formula:

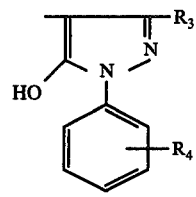

wherein $R_3$ is hydrogen, methyl, alkoxycarbonyl, carbonamido or alkyl-substituted carbonamido and $R_4$ is hydrogen, chlorine, nitro, methyl, cyano or, but only in the 3 or 4 position of the phenyl nucleus, sulphonamido, carbonamido, alkyl-substituted sulphonamido or alkyl-substituted carbonamido, the alkyl and alkoxy groups containing 1 to 4 carbon atoms. Such a dyestuff is used in the coloration of synthetic fibres.

8 Claims, No Drawings

BENZENE-AZO-HETEROCYCLIC DYESTUFFS DERIVED FROM ALKYL AMINOCINNAMATES OR AMINOCINNAMIDE

The present invention relates to new azo cinnamic dyestuffs, to processes for their preparation and to their application for the colouration of synthetic fibres, such as those based on cellulose diacetate, cellulose triacetate or more particularly aromatic polyesters or polyamides.

According to the present invention azo-cinnamic dyestuffs are provided of the general formula:

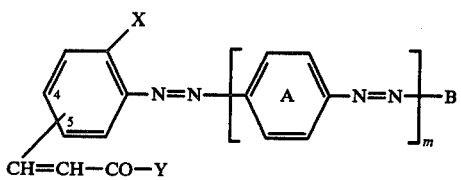
(I)

in which the residue -CH=CH-CO-Y is fixed in the 4 or 5- position, X represents a hydrogen or chlorine atom, Y represents an amino or alkoxy group containing 1 to 4 carbon atoms, the benzene nucleus A is unsubstituted or substituted by chlorine atoms or alkyl, alkoxy or acylamino groups the alkyl and alkoxy groups containing 1 to 4 carbon atoms, m represents the number 0 or 1, and B represents the residue of a substituted or unsubstituted coupling compound free from sulphonic or carboxylic acid groups.

The alkyl and alkoxy groups which may be present on the nucleus A preferably contain 1 or 2 carbon atoms. The acyl residue of the acylamino groups which may be present on the nucleus A may be for example that of an aliphatic acid having one to four carbon atoms such as formyl, acetyl or propanoyl residue, or that of an aromatic acid, for example benzoyl, or of an araliphatic acid, for example cinnamoyl.

The coupling compounds of the residue B may belong to many diverse series, such as for example those of benzene, naphthalene, quinoline, carbazole, diphenyl oxide, indazole, coumarin, acylacetarylide, pyrazolone, hydroxyquinoline, indole, nicotinonitrile and pyrazolopyridine series. The following coupling compounds are of particular interest:

1. Amines of the formula:

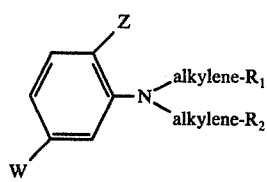
(II)

in which W represents a hydrogen or chlorine atom or a methyl, methoxy or acylamino group, Z represents a hydrogen atom or a methyl or methoxy group, $R_1$ and $R_2$ may be the same or different and each represents a hydrogen atom or a cyano, hydroxy, alkoxycarbonyl, acyloxy, acyl, alkylsulphonyl, carbonamido or alkoxycarbonyloxy group, the alkyl, alkoxy and acyl groups being those defined above:

2. Pyrazolones of the formula:

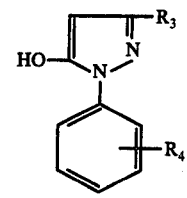
(III)

in which $R_3$ represents a hydrogen atom or a methyl, alkoxycarbonyl or carbonamido group possibly substituted by alkyl groups and $R_4$ represents a hydrogen or chlorine atom or a nitro, methyl or cyano group or also, but only in the 3 or 4 position of the phenyl nucleus, a sulphonamido or carbonamido group possibly substituted by alkyl groups, the alkyl and alkoxy groups containing 1 to 4, preferably 1 or 2, carbon atoms:

3. Phenol and its homologues, such as p-cresol, 3-acetylamino-phenol and β-naphthol;
4. N-methyl-4-hydroxy-2-quinolone or N-ethyl-4-hydroxy-2-quinolone.
5. 2-hydroxycarbazole;
6. 3-hydroxydiphenylene oxide;
7. 2-phenyl indole;
8. N-alkyl-2-hydroxy-3-cyano-4-methyl-6-pyridones, the alkyl group containing 1 or 2 carbon atoms;
9. 3,6-dimethyl-4-hydroxy-1-phenyl-(4,5-b)pyrazolopyridine.

The compounds of formula (I) in which m represents zero may be prepared, for example, by diazotisation of a base of the general formula:

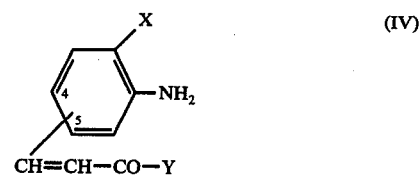
(IV)

and coupling the diazo derivative with a coupling compound BH wherein X, Y and B have the same significance as defined above.

The compounds of formula (I) in which m is equal to 1 may be prepared, for example, by coupling the diazo derivative of a base of formula (IV) with an amine of the formula:

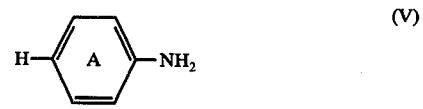
(V)

diazotisation of the amino-monoazo compound thus obtained and coupling with a coupling compound BH, wherein X, Y and B have the meanings given above.

The bases of formula (IV) in which Y represents the amino group may be prepared by various methods for example by partial hydrolysis of the corresponding amino-cinnamonitriles, partial hydrolysis of the corresponding nitro-cinnamonitriles and reduction of the nitro group, or the Meerwein reaction applied to acrylamide and to the diazonium chlorides of m- or p-nitranilines possibly substituted in the ortho position by a chlorine atom, dehydrohalogenation by means of an alkaline agent, such as sodium acetate, and finally reduction of the nitro group.

The bases of formula (IV) in which Y represents an alkoxy group may be prepared for example by esterification of the corresponding amino-cinnamic acids of formula (IV) in which Y represents a hydroxy group, or by esterification of the corresponding nitro-cinnamic acids and reduction of the nitro group, or finally according to Meerwein by reaction between an alkyl acrylate and the diazonium chloride of a nitraniline, dehydrohalogenation by means of an alkaline agent, such as triethylamine, and reduction of the nitro group.

The compounds of formula (IV) in which Y represents a hydroxy group may be prepared according to analogous processes by hydrolysis of the corresponding amino-cinnamonitriles or by hydrolysis of the corresponding nitro-cinnamonitriles and reduction of the nitro group.

The nitro-cinnamonitriles and amino-cinnamonitriles utilisable for the preparation of bases of formula (IV) may themselves be prepared, for example, by means of the Meerwein reaction applied to acrylonitrile and to the diazonium chlorides of m- or p-nitranilines possibly substituted by a chlorine atom in the ortho position, dehydrohalogenation by means of an alakline agent, such as sodium acetate, and when necessary, reduction of the nitro group.

In view of the tinctorial applications, it is advantageous for the dyestuffs obtained to be in a finely divided state. This is why the dyestuffs according to the invention are preferably previously dispersed and provided in the form of pastes or powders. The production of the predispersed form may be effected by kneading the dyestuffs in paste form with dispersing agents, if necessary in the presence of inert diluents; this kneading may possibly be followed by drying and grinding. The dyestuffs thus treated may then serve for example for dyeing in a long or short bath, by foularding or printing.

Among the dispersing agents which may be used are, for example, the products resulting from the condensation of naphthalenesulphonic acids with formaldehyde, especially dinaphthylmethanedisulphonates, the esters of sulphonated succinic acid, the alkali metal salts of the sulphuric esters of fatty alcohols, for example sodium lauryl sulphate, the lignosulphonates, soaps, alkali metal salts of the sulphuric esters of fatty acid monoglycerides, the products obtained by condensation of the cresols with formaldehyde and the naphtholsulphonic acids, products of condensation of 4,4'-dihydroxydiphenylsulphone with formaldehyde and alkali metal bisulphites.

The dyeing of polyester fibres may be effected for example, in the presence of a carrier at temperatures ranging from 80° C. to 125° C. or without a carrier under superatmospheric pressure at a temperature of from about 100° C. to 140° C. The fibres may also be foularded or printed with the aqueous dispersions of the new dyestuffs, then the impregnation obtained may be fixed at from 140° C. to 230° C., for example, by means of superheated steam, air or by contact with a heating surface. The range of temperature between 180° C. and 200° C. is particularly favourable since the dyestuffs diffuse rapidly in the polyester fibres and do not sublime, even if the action of these high temperatures is prolonged. This enables the clogging of the dyeing apparatus to be avoided.

Cellulose diacetate is preferably dyed by exhaustion at between 65° C. and 85° C. and cellulose triacetate and the polyamide fibres are preferably dyed by exhaustion at temperatures up to 115° C. The most favourable range of pH is between 2 and 9 and especially between 4 and 7. The triacetate and polyamide fibres may be foularded or printed like the polyester fibres with aqueous dispersions of the new dyestuffs, and the impregnations obtained may be fixed at between 140° C. and 210° C.

During foularding or printing, the usual thickeners may be used, for example natural products, modified or not, such as alginates, crystalline gum, carob, gum, tragacanth, carboxymethyl-cellulose, hydroxymethyl-cellulose, starch or synthetic products such as polyacrylic amides or polyvinyl alcohols.

The shades thus obtained are remarkably fast to thermal fixation, sublimation, creasing, combustion gases, over-dyeing, dry cleaning, chlorine and to wet tests, for example to water, washing and to sweat. The reserve of the natural fibres, especially wool and cotton, and the dischargeability are good. The fastness to light is remarkable even with light shades, so that the new dyestuffs are very suitable for the production of the fashionable shades. The dyestuffs resist boiling and reduction at temperatures between 80° C. and 220° C. This stability is not changed by the bath ratio, nor by the presence of dyeing accelerators. Certain compounds of formula (I) especially those in which Y is alkoxy are suited to the colouration in bulk of varnishes, oils, synthetic resins and syntnetic fibres spun from their solutions in organic solvents.

Further, the compounds of formula (I) in which Y represents an alkoxy group are particularly interesting on account of their solubility in chlorinated hydrocarbons, such as for example, trichlorethylene or perchlorethylene, which enables them to be applied continuously in a solvent medium to polyester fibres.

The invention is illustrated by the following Examples in which the parts indicated are parts by weight, unless the contrary is stated.

EXAMPLE 1

194 parts of ethyl p-aminocinnamate are dissolved in 1000 parts of water and 220 parts by volume of 19° Be hydrochloric acid, and are diazotised at 0° C. by adding 70 parts of sodium nitrite dissolved in 70 parts of water. The solution of the diazo derivative, from which excess nitrous acid has been previously removed, is introduced into a solution of 200 parts of 3'-cyano-1-phenyl-3-methyl-5-pyrazolone in 2000 parts of water containing 120 parts of sodium carbonate. The dyestuff obtained is filtered off and kneaded with a dispersing agent. It dyes polyester fibres with an exceptional tinctorial yield in a golden yellow shade of good general properties.

The ethyl p-aminocinnamate used in this Example may be prepared as follows:

A mixture of 120 parts of acrylonitrile and 1000 parts of acetone is introduced into the solution of the diazo derivative obtained from 276 parts of p-nitraniline. Then 40 parts of cupric chloride cyrstallised with 2 molecules of water are added and the mixture is kept vigorously stirred. The evolution of nitrogen is exothermal and the temperature must be maintained at 30°–32° C. by means of a cooling bath. After the diazonium chloride has disappeared (six hours), the yellow flakes which melt at 108° C. are filtered off. After recrystallising from methanol, 330 parts of 2-chloro-4'-nitro-3-phenyl-propionitrile are obtained which melts at 112° C. The product obtained is then dehydrohalogenated by means of 200 parts of crystalline sodium acetate in a mixture of 340 parts of water and 800 parts of ethyl alcohol. The mixture is heated under reflux for 12 hours and 225 parts of 4-nitro-cinnamonitrile which melts at 202° C. are isolated in the cold.

The 4-nitro-cinnamonitrile thus obtained is then reduced by the Béchamp reaction in 2000 parts of water and 800 parts of ethyl alcohol. 4-amino-cinnamonitrile which melts at 109°–110° C. is thus obtained. Yield: 76%.

| Analysis | C % | H % | N % |
|---|---|---|---|
| Calculated for $C_9H_8N_2$ | 75.00 | 5.55 | 19.44 |
| Found | 75.02 | 5.77 | 19.25 |

72 parts of 4-amino-cinnamonitrile are introduced into 250 parts of a 20% sodium hydroxide solution, and the mixture is heated for 3 hours under reflux until the evolution of ammonia ceases, and is then cooled, neutralised with 140 parts of 19° Bé hydrochloric acid, filtered off at 20° C. and recrystallised from 300 parts of water. 4-amino-cinnamic acid is thus obtained. M.p. 175° C. Yield: 71%.

| Analysis | C % | H % | N % |
|---|---|---|---|
| Calculated for $C_9H_9O_2N$ | 66.25 | 5.52 | 8.58 |
| Found | 66.26 | 5.47 | 8.64 |

32.6 parts of 4-amino-cinnamic acid are heated under reflux for three hours in a mixture comprising 100 parts of absolute ethyl alcohol and 20 parts of 66°Bé sulphuric acid. The product is poured on to 200 parts of water and 200 parts of ice, made alkaline to pH 8 by the addition of 38 parts of a 35° Bé solution of sodium hydroxide, and the solid is filtered off, washed with water and recrystallised from 150 parts of ethyl alcohol and 150 parts of water. Ethyl-p-amino-cinnamate is thus obtained. Yield 78% M.p. 68°–69° C.

| Analysis | C % | H % | N % |
|---|---|---|---|
| Calculated for $C_{11}H_{13}O_2N$ | 69.10 | 6.80 | 7.32 |
| Found | 69.32 | 6.72 | 7.28 |

EXAMPLE 2

The procedure is as in the preceding Example, but the 200 parts of 3'-cyano-1-phenyl-3-methyl-5-pyrazolone are replaced by 231 parts of 1-phenyl-3-ethoxycarbonyl-5-pyrazolone. The dyestuff thus obtained dyes polyester fibres in an orange-yellow shade of good general fastness; the tinctorial yield is very high.

EXAMPLE 3

205.5 parts of ethyl 3-chloro-4-amino-cinnamate are stirred in 220 parts of water and 220 parts of 19° Bé hydrochloric acid. Then 600 parts of water are added and diazotisation is carried out at 0° C. by the addition of 70 parts of sodium nitrite dissolved in 70 parts of water. The excess nitrous acid is destroyed, then the solution obtained is run into 232 parts of N-ethyl-N-cyanoethyl-meta-toluidine dissolved in 1000 parts of water and 110 parts of 19° Bé hydrochloric acid, and the medium is buffered by the addition of 60 parts of sodium acetate dissolved in 150 parts of water. The dyestuff obtained is filtered off, then dispersed. It dyes polyester fibres an orange shade of good general fastness.

The following Table summarises other Examples of dyestuffs according to the invention of the general formula:

(VI)

$$\text{Structure with X at top of benzene ring, N=N-B substituent, and CH=CH-CO-Y group}$$

| Example | Y | X | Position of the —CH=CH—CO—Y residue | Coupling Compound B-H | Shades on polyester fibres |
|---|---|---|---|---|---|
| 4 | methoxy | H | 4 | 1-phenyl-3-methyl-5-pyrazolone | yellow |
| 5 | " | H | 5 | " | green yellow |
| 6 | " | Cl | 4 | " | yellow |
| 7 | " | Cl | 5 | " | green-yellow |
| 8 | n-butoxy | H | 4 | " | yellow |
| 9 | ethoxy | H | 4 | 1-(3-N,N-diethylcarbonamido phenyl)-3-methyl-5-pyrazolone | yellow |
| 10 | " | H | 4 | 1-(3-N,N-diethylsulphonamido-phenyl)-3-methyl-5-pyrazolone | yellow |
| 11 | amino | H | 4 | 1-phenyl-3-methyl-5-pyrazolone | yellow |
| 12 | " | H | 4 | 3'-cyano-1-phenyl-3-methyl-5-pyrazolone | yellow |
| 13 | ethoxy | H | 4 | N-methyl-4-hydroxy-2-quinolone | yellow |
| 14 | " | H | 5 | N-methyl-4-hydroxy-2-quinolone | green-yellow |
| 15 | amino | H | 4 | " | yellow |
| 16 | ethoxy | H | 4 | N-ethyl-N-cyanoethyl-aniline | orange |
| 17 | amino | H | 4 | N-ethyl-N-cyanoethyl-aniline | orange |
| 18 | ethoxy | H | 4 | N-ethyl-N-acetyloxy-ethyl-aniline | orange |
| 19 | n-butoxy | H | 4 | " | orange |
| 20 | amino | H | 4 | " | orange |
| 21 | ethoxy | H | 4 | N-cyanethyl-N-acetyloxy- | |

-continued (VI)

structure: benzene ring with X at one position, N=N—B at adjacent position, and CH=CH—CO—Y at position 4 or 5

| Example | Y | X | Position of the —CH=CH—CO—Y residue | Coupling Compound B-H | Shades on polyester fibres |
|---|---|---|---|---|---|
| 22 | amino | H | 4 | ethyl-aniline | orange |
| 23 | ethoxy | H | 4 | " | orange |
| 24 | n-butoxy | H | 4 | ethyl ester of N-ethyl-N-phenyl-aminopropionic acid | orange |
| 25 | amino | H | 4 | " | orange |
| 26 | ethoxy | H | 5 | " | orange |
| 27 | " | Cl | 4 | " | red-orange |
| 28 | amino | Cl | 4 | " | red-orange |
| 29 | ethoxy | H | 4 | N,N-dimethyl-N'-acetyl-metaphenylenediamine | scarlet |
| 30 | " | Cl | 5 | N,N-dimethyl-N'-acetyl-metaphenylenediamine | red-orange |
| 31 | amino | H | 4 | " | scarlet |
| 32 | ethoxy | H | 4 | N,N-di(acetyloxyethyl)-aniline | orange |
| 33 | butoxy | H | 4 | " | orange |
| 34 | amino | H | 4 | " | orange |
| 35 | ethoxy | H | 4 | N-ethyl-N-(2-methylsulphonylethyl)-aniline | orange |
| 36 | amino | H | 4 | N-ethyl-N-(2-methylsulphonylethyl)-aniline | orange |
| 37 | methoxy | H | 4 | para-cresol | yellow |
| 38 | amino | H | 4 | " | yellow |
| 39 | methoxy | H | 4 | β-naphthol | scarlet |
| 40 | amino | H | 4 | " | scarlet |
| 41 | methoxy | H | 4 | 3-hydroxy-diphenylene oxide | brown-orange |
| 42 | amino | H | 4 | " | brown-orange |
| 43 | methoxy | H | 4 | 2-hydroxy-carbazole | brown-orange |
| 44 | amino | H | 4 | " | brown-orange |
| 45 | ethoxy | H | 4 | 1-phenyl-3-carbethoxy-5-pyrazolone | yellow-gold |
| 46 | propyloxy | H | 4 | " | yellow-gold |
| 47 | methoxy | H | 4 | N-ethyl-2-hydroxy-3-cyano-4-methyl-6-pyridone | yellow |
| 48 | amino | H | 4 | " | yellow |
| 49 | methoxy | H | 4 | 3,6-dimethyl-4-hydroxy-1-phenyl-(4,5-b) pyrazolo-pyridine | " |
| 50 | amino | H | 4 | " | " |
| 51 | ethoxy | H | 4 | 1-phenyl-3-carbonamido-5-pyrazolone | " |
| 52 | methoxy | H | 4 | 1-phenyl-3-(N,N-dimethylcarbonamido)-5-pyrazolone | yellow-gold |
| 53 | methoxy | H | 4 | 1-phenyl-3-(N,N-diethylcarbonamido)-5-pyrazolone | yellow-gold |
| 54 | ethoxy | H | 4 | 3'-chloro-1-phenyl-3-methyl-5-pyrazolone | yellow |
| 55 | ethoxy | H | 4 | 4'-chloro-1-phenyl-3-methyl-5-pyrazolone | " |
| 56 | ethoxy | H | 4 | 3'-methyl-1-phenyl-3-methyl-5-pyrazolone | yellow |
| 57 | ethoxy | H | 4 | 4'-methyl-1-phenyl-3-methyl-5-pyrazolone | yellow |
| 58 | ethoxy | H | 4 | 3'-nitro-1-phenyl-3-methyl-5-pyrazolone | yellow |
| 59 | " | H | 4 | 4'-nitro-1-phenyl-3-methyl-5-pyrazolone | yellow |
| 60 | " | H | 4 | 3'-N,N-dimethylcarbonamido-1-phenyl-3-methyl-5-pyrazolone | yellow |
| 61 | " | H | 4 | 4'-N,N-dimethylcarbonamido-1-phenyl-3-methyl-5-pyrazolone | yellow |
| 62 | " | H | 4 | 4'-N,N'diethylcarbonamido-1-phenyl-3-methyl-5-pyrazolone | " |
| 63 | " | H | 4 | 4'-N,N-diethylsulphonamido-1-phenyl-3-methyl-5-pyrazolone | " |
| 64 | " | H | 4 | 3'-N,N-dimethylsulphonamido-1-phenyl-3-methyl-5-pyrazolone | yellow |
| 65 | " | H | 4 | 4'-N,N-dimethylsulphonamido-1-phenyl-3-methyl-5-pyrazolone | " |
| 66 | " | H | 4 | N-ethyl-4-hydroxy-2-quinolone | green-yellow |
| 67 | " | H | 4 | N-ethyl N-hydroxyethyl meta-toluidine | red-orange |

-continued (VI)

$$\text{structure with X, N=N-B, CH=CH-CO-Y}$$

| Example | Y | X | Position of the —CH=CH—CO—Y residue | Coupling Compound B-H | Shades on polyester fibres |
|---------|---|---|---|---|---|
| 68 | " | Cl | 4 | N-ethyl N-acetyloxyethyl meta-chloraniline | orange-yellow |
| 69 | " | H | 4 | N,N-di(acetyloxyethyl) N'-formyl meta-phenylenediamine | red-orange |
| 70 | " | H | 4 | N,N-di(acetyloxyethyl) N'-propanoyl meta-phenylenediamine | " |
| 71 | " | H | 4 | N,N-di(acetyloxyethyl) N'-benzoyl meta-phenylenediamine | " |
| 72 | " | H | 4 | N,N-di(acetyloxyethyl) N'-cinnamoyl meta-phenylenediamine | " |
| 73 | " | H | 4 | N,N-di(acetyloxyethyl)ortho-toluidine | " |
| 74 | " | H | 4 | N,N-di(acetyloxyethyl) ortho-cresidine | red |
| 75 | " | H | 4 | N-ethyl-N(2-acetyl ethyl) aniline | orange |
| 76 | " | H | 4 | 3-(N-ethyl-anilino)-propanamide | orange |
| 77 | " | H | 4 | N-ethyl N(ethoxycarbonyloxyethyl) aniline | orange |
| 78 | " | H | 4 | phenol | yellow |
| 79 | " | H | 4 | N-methyl-2-hydroxy-3-cyano-4-methyl-6-pyridone | " |
| 80 | " | H | 4 | 3-acetylamino phenol | " |
| 81 | " | Cl | 4 | 3'-cyano-1-phenyl-3-methyl-5-pyrazolone | golden yellow |
| 82 | " | Cl | 4 | 1-phenyl-3-ethoxycarbonyl-5-pyrazolone | orange yellow |

By way of example, the 4-amino-cinnamamide may be prepared as follows:

72 parts of 4-amino-cinnamonitrile are gradually added to 85 parts of 66° Bé sulphuric acid diluted by 15 parts of water. The temperature rises of itself to 100°-105° C. It is maintained up to the end of the addition, then heated for 50 minutes at 100°-105° C., cooled to 20° C. and run on to 100 parts of water and 200 parts of ice. The product is neutralised by adding 170 parts of a 35° Bé solution of sodium hydroxide, the temperature being maintained at 10°-20° C. and the solid is then filtered off and dried. 56 parts of 4-amino-cinnamamide are thus obtained. It is recrystallised from 400 parts of monochlorobenzene, M.p. 200° C.

| Analysis | C % | H % | N % |
|---|---|---|---|
| Calculated for $C_9H_{10}ON_2$ | 66.66 | 6.17 | 17.28 |
| Found | 66.30 | 6.28 | 17.34 |

EXAMPLE 83

191 parts of ethyl para-aminocinnamate are dissolved in 1000 parts of water and 220 parts by volume of 19° Bé hydrochloric acid and diazotised at 0° C. by adding 70 parts of sodium nitrite dissolved in 70 parts of water. The excess nitrous acid is destroyed and the solution of the diazo derivative is rapidly introduced into a solution of 117 parts of metatoluidine in 2500 parts of water and 110 parts of 19° Bé hydrochloric acid. 2400 parts of a 20% aqueous solution of sodium acetate are added in a period of an hour and a half, the product is filtered and the paste is taken up in 2500 parts of water. 400 parts by volume of 19° Bé hydrochloric acid are added, the mixture is stirred for an hour and is diazotised with 65 parts of sodium nitrite dissolved in 65 parts of water. The solution thus obtained is introduced slowly, after filtration, into 232 parts of 1-phenyl-3-carbonamido-5-pyrazolone dissolved in 4000 parts of water with 40 parts of sodium hydroxide and 400 parts of sodium carbonate. The dyestuff obtained, prepared in the dispersed state, dyes polyester fibres in a scarlet shade of good general properties.

The following Table summarises other Examples of dyestuffs according to the invention corresponding to the general formula:

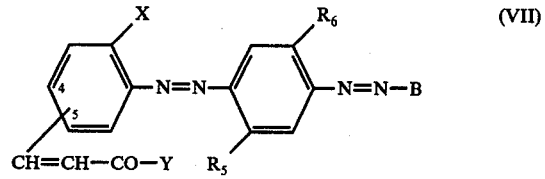

(VII)

| Example | X | Y | $R_5$ | $R_6$ | Position of the residue —CH=CH—CO—Y | B | Shade on polyester fibres |
|---|---|---|---|---|---|---|---|
| 84 | H | $OC_2H_5$ | $OCH_3$ | H | 4 | 2-methyl-4-(N-ethyl-N-cyanoethyl-amino)-phenyl | bordeaux |
| 85 | H | $NH_2$ | $OCH_3$ | H | 4 | " | " |
| 86 | H | $OC_2H_5$ | $NHCOCH_3$ | H | 4 | 1-phenyl-3-ethoxy-carbonyl-5-oxo-4-pyrazolyl | scarlet |
| 87 | H | $NH_2$ | $NHCOCH_3$ | H | 4 | " | " |
| 88 | Cl | $OCH_3$ | $NHCOCH_3$ | H | 4 | " | " |
| 89 | H | $OC_2H_5$ | $OCH_3$ | H | 4 | 2-phenyl-(-3) indolyl | red |
| 90 | H | $NH_2$ | $OCH_3$ | H | 4 | " | red |
| 91 | H | $OC_2H_5$ | $CH_3$ | H | 4 | 4-N,N-di(acetyloxy-ethyl)amino phenyl | scarlet |
| 92 | H | $OC_2H_5$ | $CH_3$ | $OCH_3$ | 4 | 1-phenyl-3-methyl-5-oxo-4-pyrazolyl | scarlet |
| 93 | H | $NH_2$ | $CH_3$ | $OCH_3$ | 5 | " | scarlet |
| 94 | H | $OC_2H_5$ | $CH_3$ | H | 4 | 4-(N-ethyl N-cyano-ethyl amino)-phenyl | scarlet |

EXAMPLE 95

A fabric of ethyleneglycol polyterephthalate fibres is printed with a printing paste comprising 20 parts of the dyestuff described in Example 4, 150 parts of a solid salt of sulphonated castor oil, 600 parts of a thickener and 250 parts of water. After drying, the fabric is heat-fixed for one minute at 200° C. and then subjected to a reducing treatment. A yellow shade of good general fastness is obtained.

EXAMPLE 96

A fabric of ethyleneglycol polyterephthalate is foularded in a bath comprising 9 parts of the dyestuff of Example 16, 0.5 parts of a polyglycol ether of oleyl alcohol, 1.5 parts of a polyacrylamide and the amount of water necessary to make up to 1000 parts. After drying, the fabric is heat-fixed for 1 minute at 200° C. and then subjected to a reducing treatment with sodium dithionite. An orange shade is obtained of good general fastness.

EXAMPLE 97

A fabric of ethyleneglycol polyterephthalate fibres is foularded in a solution of 10 parts of the dyestuff of Example 2 in 1000 parts by volume of trichlorethylene, dried and heat-fixed for 1 minute at 180° C., then subjected to a reducing treatment. An orange-yellow shade of good general fastness is obtained.

We claim:

1. A dyestuff of the formula:

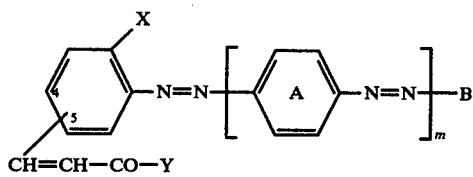

in which -CO=CH-CO-Y is fixed in the 4 or 5 position, X is hydrogen or chlorine, Y is amino or alkoxy containing 1 to 4 carbon atoms, the p-phenylene nucleus A is unsubstituted or substituted by chlorine, alkyl containing 1 to 4 carbon atoms, alkoxy containing 1 to 4 carbon atoms, formylamino, acetylamino, propanoylamino, benzoylamino or cinnamoylamino, m is zero or one, and B represents the radical N-methyl (or ethyl)-4-hydroxy-2-oxo-quinolyl, 2-hydroxy-carbazolyl, 3-hydroxy-dibenzofuranyl, 2-phenyl-indolyl, N-methyl (or ethyl)-2-hydroxy-3-cyano-4-methyl-6-oxo-pyridyl, 3,6-dimethyl-4-hydroxy-1-phenyl-(4,5-b)pyrazolopyridyl or the radical of formula:

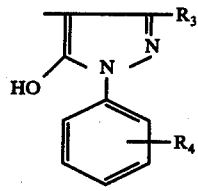

wherein $R_3$ is hydrogen, methyl, alkoxycarbonyl, carbonamido or alkyl-substituted carbonamido and $R_4$ is hydrogen, chlorine, nitro, methyl, cyano or, but only in the 3 or 4 position of the phenyl nucleus, sulphonamido, carbonamido, alkyl-substituted sulphonamido or alkyl-substituted carbonamido, the alkyl and alkoxy groups of $R_3$ and $R_4$ containing 1 to 4 carbon atoms.

2. Dyestuff according to claim 1 wherein any alkyl contains 1 or 2 carbon atoms.

3. Dyestuff according to claim 1 wherein any alkoxy contains 1 or 2 carbon atoms.

4. The dyestuff of formula:

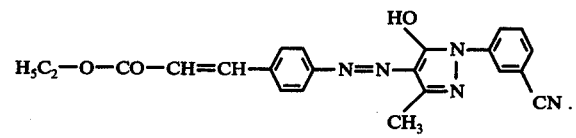

5. The dyestuff of formula:

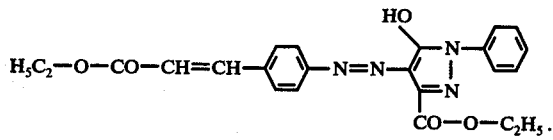

6. The dyestuff of formula:

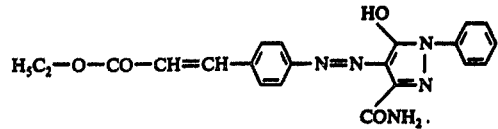
7. The dyestuff of formula:
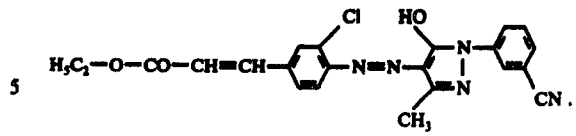
8. The dyestuff of formula:
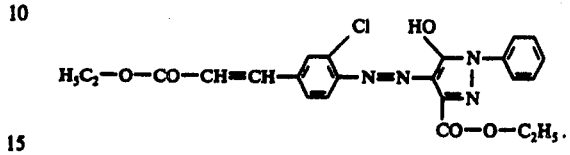
* * * * *